United States Patent [19]
Amos et al.

[11] Patent Number: 5,366,527
[45] Date of Patent: Nov. 22, 1994

[54] METHOD AND APPARATUS FOR COATING OPTICAL WAVEGUIDE FIBERS

[75] Inventors: Lynn G. Amos; Paul A. Chludzinski, both of Wilmington, N.C.; Heidi B. Leoni, Painted Post, N.Y.; Johnnie E. Watson, Hampstead; Richard R. Williams, Wilmington, both of N.C.

[73] Assignee: Corning Incorporated, Corning, N.Y.

[21] Appl. No.: 43,448

[22] Filed: Apr. 5, 1993

[51] Int. Cl.$^5$ .......................................... C03B 37/025
[52] U.S. Cl. ................................... 65/382; 65/29.19; 118/600; 118/667; 118/698; 118/420; 427/163.2
[58] Field of Search .................. 65/2, 3.11, 12, 13, 65/29, 11.1, 3.43; 118/698, 667, 600, 720

[56] References Cited

U.S. PATENT DOCUMENTS

| | | | |
|---|---|---|---|
| 4,073,974 | 2/1978 | Albarino et al. | 427/163 |
| 4,388,093 | 6/1983 | Kimura | 65/3.11 |
| 4,514,205 | 4/1985 | Darcangelo et al. | 65/12 |
| 4,531,959 | 7/1985 | Kar et al. | 65/3.11 |
| 4,594,088 | 6/1986 | Paek et al. | 65/3.4 |
| 4,622,242 | 11/1986 | Mackay | 427/163 |
| 4,792,347 | 12/1988 | Deneka et al. | |
| 4,867,775 | 9/1989 | Cain et al. | 65/3.43 |
| 5,043,001 | 8/1991 | Cain et al. | 65/2 |
| 5,127,361 | 7/1992 | Matsuda et al. | 65/3.43 |

FOREIGN PATENT DOCUMENTS 63-74938 4/1988 Japan.

OTHER PUBLICATIONS

Paek et al., "Forced Convective Cooling of Optical Fibers in High Speed Coating", J. of Applied Physics, vol. 50, No. 10, pp. 6144–6148, Oct. 1979.

Caillat et al., "Thermoelectric properties of $(Bi_xSb_{1-x})_2Te_3$ Single Crystal Solid Solutions Grown by the T.H.M. Method", J. Phys. Chem. Solids, vol. 53, No. 8, pp. 1121–1129, 1992.

Patel et al., "Thermoelectric Cooling Effect in a p-$Sb_2Te_3$-n-$Bi_2Te_3$ Thin Film Thermocouple", Solid-State Electronics, vol. 35, No. 9, pp. 1269–1272, 1992.

Primary Examiner—Robert L. Lindsay
Attorney, Agent, or Firm—Bruce E. Kamerer

[57] ABSTRACT

A method and apparatus is provided for controlling the diameter of a coated optical waveguide fiber. The viscosity profile of the coating material is controlled by adjusting the temperature of a portion of the coating assembly based on a measurement of the diameter of the coated fiber. By controlling the viscosity profile of the coating material, the amount of coating applied to the fiber is controlled,, thereby determining the diameter of the coated fiber.

17 Claims, 4 Drawing Sheets

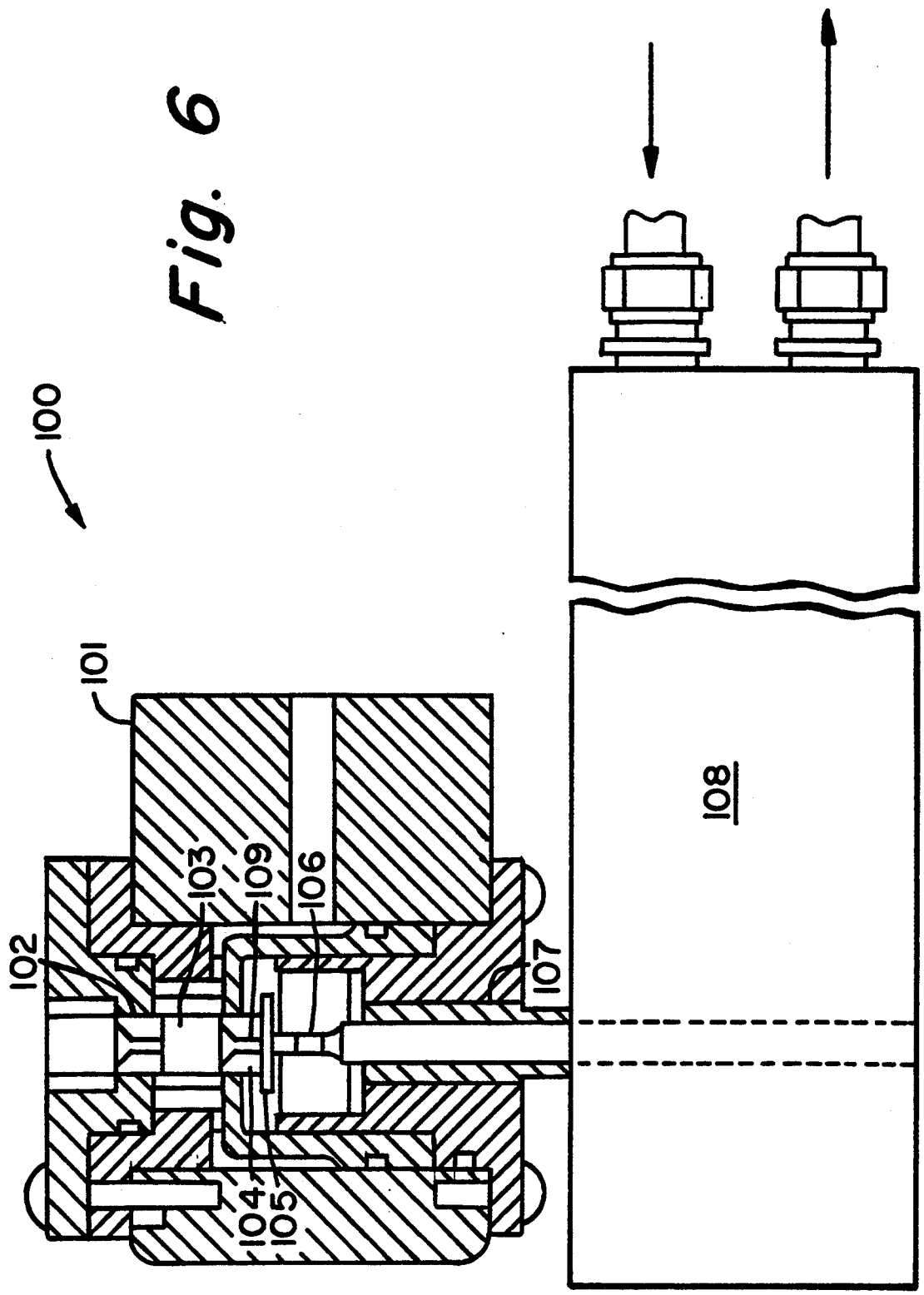

METHOD AND APPARATUS FOR COATING OPTICAL WAVEGUIDE FIBERS

BACKGROUND OF THE INVENTION

This invention relates to the coating of optical waveguide fibers.

In the manufacture of optical waveguide fibers, a preferred method for manufacturing the fibers is i) produce a preform using deposition techniques such as outside vapor deposition (OVD), vapor axial deposition (VAD) or modified chemical vapor deposition (MCVD); ii) dehydrate and consolidate the OVD or VAD soot preform (or, collapse the MCVD preform) to produce a solid glass preform; and iii) draw the glass preform into fiber. Because of the requirements of high strength and low loss, a protective coating is applied to the drawn fiber before the pristine surface of the fiber is damaged by subsequent handling, either during manufacture or subsequent use. This coating step is typically performed as an integral part of the drawing process to ensure that the coating material is applied before the surface of the fiber is damaged. Optical fibers are also combined in arrays, known as ribbon fibers, the manufacture of which requires that an overcoating be applied to an array of coated or uncoated optical fibers.

A coating material commonly used in the manufacture of optical waveguide fibers is an acrylate-based composition which is curable by exposure to ultraviolet (UV) light. This material is applied to the surface of the fiber in a liquid state and is subsequently exposed to UV light for curing. The coating material may be applied in one or more layers, with a two-layer coating system being a preferred embodiment. The first, or primary, coating is applied directly to the surface of the fiber, and the second, or secondary, coating is applied over the primary coating.

When coating an optical waveguide fiber, it is important to produce, at high drawing rates, coated fibers with consistent coated diameter and coatings which are applied concentrically to the fiber. Both of these attributes contribute to ease in splicing and connectorization of the fiber, thereby providing for lower losses in an installed fiber application. The higher draw rates reduce the cost of manufacturing the fiber by increasing output and equipment utilization. Market demands continue to place more stringent tolerances on the coated diameter of an optical waveguide fiber. Present manufacturing processes provide coatings with tolerances of about $\pm 15$ $\mu$m, while tolerances in the range of about $\pm 3-5$ $\mu$m are needed.

Much work has been directed toward cooling the drawn fiber prior to receiving the first layer of coating material. This is required because the high drawing temperatures (in the range of 1,800° to 2,000° C.) and increasing drawing rates would result in the temperature of the fiber at the first coating application being too high for adequate coating to occur. If the fiber temperature is too high when the coating is applied, the quality, dimensions, and consistency of the coating thus applied would be adversely affected. It is generally known that the fiber temperature should be less than about 300° C. for proper application of the coating material. Pack et al., "Forced Convective Cooling of Optical Fibers in High Speed Coating", J. of Applied Physics, vol. 50, no. 10, pp. 6144–48, Oct. 1979. Examples of systems designed to reduce the temperature of the fiber prior to the first application of coating include:

Paek et al. U.S. Pat. No. 4,594,088 which discloses a fiber drawing system which includes a cooling chamber containing a liquid heat transfer medium through which the fiber is drawn prior to application of the coating material;

Darcangelo et al. U.S. Pat. No. 4,514,205 which discloses an elongated coolant tube into which both a hot drawn fiber and cooled helium are introduced, and the cooled helium reduces the temperature of the fiber prior to application of the coating material; and Cain et al. U.S. Pat. No. 5,043,001 which discloses a cooling chamber which contains a liquid through which a hot fiber passes and is cooled thereby, the cooled fiber not being wetted by the liquid because a vapor barrier is formed at the surface of the fiber due to boiling of the liquid at the fiber surface.

A fiber drawing and coating system, as currently used in the production of optical waveguide fibers, is shown in FIG. 1. Fiber 10 is drawn from preform 11 which is heated in furnace 1. Fiber 10 then passes through fiber cooling device 2 and is cooled to a temperature below about 90° C. Fiber 10 then passes through primary coater assembly 3 and is coated with a primary layer of coating. The primary coating layer is cured in primary coating curing device 4, and the diameter of the fiber including the cured primary coating is measured by device 5. Curing device 4 typically comprises an irradiator array. Fiber 10 then passes through secondary coater assembly 6 and is coated with a secondary layer of coating. The secondary coating layer is cured in secondary coating curing device 7, which is similar to primary coating curing device 4, and the diameter of the fiber including the cured secondary coating is measured by device 8. Tractor means 9 is used to pull the fiber from furnace 1 through the intermediate devices. The fiber is then typically taken up onto spools by a winder (not shown) for further processing.

FIG. 2 is a more detailed view of a coating die assembly. Fiber 21 enters coating die assembly 20 through guide die 22. Coating material is delivered to coating die assembly 20 through holes 24 in insert 23. The coating material is delivered under pressure at a constant temperature. Fiber 21 exits coating die assembly 20 through sizing die 25. As fiber 21 passes through coating die assembly 20, the coating material is accelerated. As the coating material and fiber 21 enter sizing die 25, a portion of the coating material is pulled out with the fiber. The coating material that is accelerated by the fiber, but not pulled out with the fiber, recirculates within coating die assembly 20. Coating die assembly 20, as shown in FIG. 2, is similar to that disclosed in Kar U.S. Pat. No. 4,531,959, the relevant portions of which are incorporated herein by reference. The coating is applied using a method which reduces the formation of bubbles in the coating as disclosed in Deneka et at. U.S. Pat. No. 4,792,347, the relevant portions of which are incorporated herein by reference.

The amount of coating material which is drawn out with fiber 21 is dependent on the velocity profile of the coating material within sizing die 25. This velocity profile is most affected by the speed at which fiber 21 is drawn through coating die assembly 20, the geometry of sizing die 25 and the viscosity profile of the coating material in sizing die 25. The viscosity profile of the coating material is a function of its temperature, which is influenced by: i) the temperature of fiber 21; ii) the temperature of the walls of sizing die 25; iii) internal heat generation known as "viscous heating" which is the result of the conversion of mechanical energy to thermal energy via fluid friction; iv) the temperature of the incoming coating; and v) the temperature of any surface with which the coating thermally communicates. The viscosity profile can also be a function of shear rate or, equivalently, an applied stress. Fluids such as these are described as non-Newtonian.

For a given coating die assembly geometry, the coated fiber diameter is determined by the velocity profile within the coating material at the exit of sizing die 25. The velocity profile at the exit of sizing die 25 can be affected by the velocity profile at other parts of coating die assembly 20. Therefore, the region at or near which the coated fiber diameter is determined can include any portion of coating die assembly 20 in which the velocity profile can be affected such that the velocity profile at the exit of sizing die 25 is also affected. This region can include the entire sizing die, or even portions of coating die assembly 20 near insert 23, if the control of the coating material temperature, and, therefore, the viscosity profile, can be sufficient to provide adequate control of the coated fiber diameter. However, as noted below, we have found that when the region in which the viscosity profile is controlled, by controlling the temperature of the coating material, is localized to land region 26 of sizing die 25, one can achieve very responsive control of coated fiber diameter.

Referring to reference numbers in FIG. 1, while it is possible to control the temperature of fiber 10 after primary coating device 4 and prior to secondary coater assembly 6, it is generally neither convenient nor practical to do so. For example, it takes either a long residence time in a low gas flow temperature adjusting apparatus or a high gas flow in a short residence time temperature adjusting apparatus to change the temperature of the fiber. This is due to the relatively high thermal mass of the fiber in combination with the primary coating layer (approximately three times the thermal mass as compared to an uncoated fiber). There are space limitations on the fiber drawing apparatus which prevent the use of a long residence time temperature adjusting apparatus. Also, changing the temperature of the fiber may have adverse affects on subsequent steps in the fiber drawing process.

Albarino et al. U.S. Pat. No. 4,073,974 discloses a coating system which includes a coil for heating the coating material prior to delivery to a sizing die. The heating coil is used to adjust the temperature of the coating material, thereby adjusting the viscosity of the coating material. The heating coil, however, is located a significant distance from the sizing die of the coating system which is located near the point at which the fiber exits the coating system. Therefore, the effect of the heating coil on the viscosity of the coating material at the sizing die is, at best, unpredictable. We believe this is particularly true because of the effects of viscous heating described previously. There is no disclosure in Albarino et al. of any measurement of coated fiber diameter or use of any such measurement to control the heating coil.

Mackay U.S. Pat. No. 4,622,242 discloses a pressurized coating material applicator die in which a single heat exchange "circuit" is used to control the temperature of a coating material in a coating supply tube and, optionally, a coating die chamber. The system disclosed in Mackay requires that, if the coating die chamber is included in the "circuit", the temperature of the coating material in the coating supply tube and in the coating die chamber are the same. The temperature of the coating material is predetermined based on the particular coating material used. There is no disclosure in Mackay of any feedback control of the die temperature based on coated fiber diameter. Also, the system disclosed in Mackay affects only the macroscopic temperature of the entire applicator die. These limitations will adversely impact the coated fiber diameter.

Hosotani et al. Japanese Patent Publication No. 63-74938 discloses a coating system which includes a variable-temperature gas temperature adjusting apparatus used to modify the temperature of a fiber after the primary coating layer has been applied to the fiber and cured. Hosotani et al. discloses that by controlling the fiber temperature prior to application of the secondary coating, the viscosity distribution of the secondary coating is affected which will in turn affect the amount of secondary coating applied to the fiber.

The system disclosed in Hosotani et al. is shown in FIG. 3. Fiber 33 is drawn from preform 31, which is heated in furnace 32. The fiber is coated with a primary coating layer as it passes through primary coater assembly 34. The primary coating layer is cured in curing device 35. The temperature of the fiber with the cured primary coating is adjusted by temperature adjusting apparatus 36 prior to entering secondary coater assembly 37. The secondary coating is cured in curing device 38, and the diameter of the fiber with both the secondary and primary coatings is measured by diameter measuring device 39.

In Hosotani et al., the temperature of the fiber is adjusted prior to the application of the secondary coating based on the diameter of the coated fiber (both the primary and secondary coatings). Temperature adjusting apparatus 36 blows a gas, such as $N_2$, on the fiber to change the temperature of the fiber. The gas temperature is changed using a heater or cooling device as required to obtain the desired fiber temperature. The system disclosed in Hosotani et al. has several problems. First, the examples disclosed in Hosotani et at. are for fiber drawing rates in a range of about 0.8 to 1.7 m/sec. We believe that the system would require large quantities of contaminant and particulate free gas to affect the temperature of the primary coated fiber at the higher drawing speeds, for example, faster than about 5 m/sec, which are typical in current production of optical waveguide fibers. Second, even if the temperature of the primary coated fiber can be affected using the system disclosed in Hosotani et al., the speed at which such a system reacts to short-term variations in coated fiber diameter will be substantially slower than required for tight tolerances on coated fiber diameter.

SUMMARY OF THE INVENTION

Variation in the amount of coating material drawn out of the sizing die results in large fluctuations in the outside diameter of the coated fiber. We have discovered that by controlling the viscosity profile of the coating material at or near the region in which the coated fiber diameter is determined, diameter fluctuations may be improved threefold or better. We control the viscosity profile by controlling the temperature of the coating material at or near the region in which the coated fiber diameter is determined.

According to one aspect of the present invention, an apparatus is provided for coating an optical waveguide fiber which controls the viscosity profile of a coating material in a sizing die. By controlling the viscosity profile of the coating material in the sizing die, the amount of coating applied to the fiber can be controlled.

According to another aspect of the present invention, a method is provided for coating an optical waveguide fiber wherein the amount of coating applied to the fiber is controlled by adjusting the temperature of the coating material in a sizing die, thereby affecting the viscosity profile of the coating material at or near the region in which the coated fiber diameter is determined.

According to another aspect of the present invention, an apparatus is provided for coating an optical waveguide fiber which controls the temperature of a coating material at or near the region in which the coated fiber diameter is determined independent of controlling the bulk temperature of the coating material as it is introduced into the apparatus.

BRIEF DESCRIPTION OF THE DRAWINGS

FIG. 6 is a cross-sectional view of a coating die assembly according to another aspect of the present invention.

DETAILED DESCRIPTION

Figure 2:
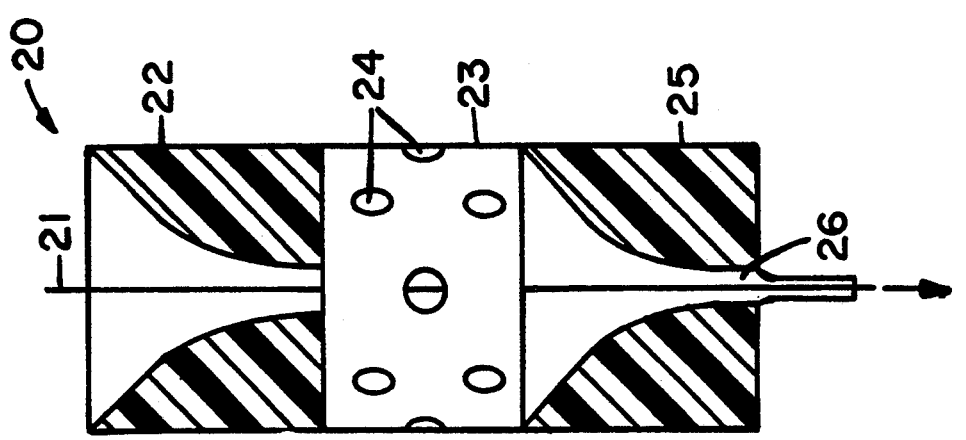
FIG. 2 is cross-sectional view of a typical coating die assembly.

As previously described, FIG. 2 shows a typical coating die assembly currently used in the process of coating optical waveguide fibers. The inlet, or bulk, temperature of the coating material, introduced through holes 24 of insert 23, is maintained at a desired value by a heat exchanger (not shown) in communication with the coating delivery line. The temperature-controlled coating is radially distributed about insert 23 before entering die assembly 20. The coating material is typically supplied to die assembly 20 under pressure. A pressurized coater insures the level of coating material inside die assembly 20 is maintained at the same level throughout the fiber coating process.

Figure 4:
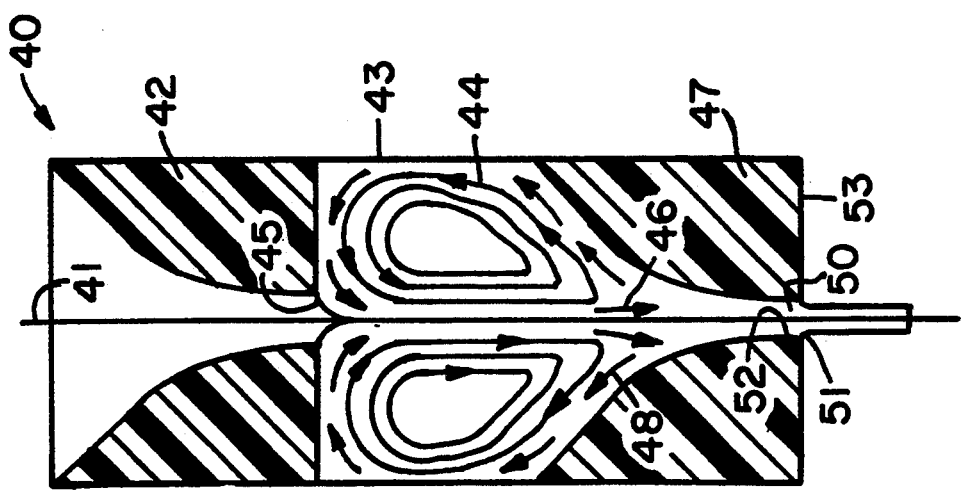
FIG. 4 represents the fluid dynamics inside a typical coating die assembly.

FIG. 4 shows the dynamics of the coating process. Fiber 41 enters die assembly 40 through guide die 42. The coating material is introduced at insert 43. As fiber 41 enters recirculation region 44, an upper meniscus 45 is formed at the interface between the fiber and the coating material. As the coating material and fiber 41 enter sizing die 47, a portion of the coating material is pulled out with the fiber. The coating material which is accelerated by the fiber, but is not pulled out with the fiber, recirculates within coating die assembly 40. Fiber 41 then continues through die land region 50 and exits coating die assembly 40. Lower meniscus 51 forms where the fiber exits coating die assembly 40. Die land region 50 is defined as the region at the exit of sizing die 47 where the inside diameter of sizing die 46 is substantially constant with distance from the exit of sizing die 47.

Finite element analysis indicates that the velocity profile in land region 50 is significantly affected by the temperature of inner wall 52 as well as the fiber temperature. The velocity profile is affected by these temperature variations because such temperature variations change the viscosity profile of the coating material. The velocity profile is also affected by the speed at which fiber 41 is pulled through die assembly 40. The shear stresses, which develop due to the speed of the fiber through the coating material, and the viscosity of the coating material itself, combine to generate heat. This phenomenon is known as viscous heating. Coating material which does not exit sizing die 47 with fiber 41 recirculates within coating die assembly 40 and also contributes to viscous heating. Finite element analysis also indicates that this internal heat generation causes significant changes in the temperature of the inner wall 52 of sizing die 47, especially near die land region 50. Coating material near the surface fiber 41 is accelerated to the speed of the fiber, while coating material at or near the walls of sizing die 47 is essentially not moving, thus generating the velocity profile.

The coated fiber diameter is determined by the flow of coating material throughout the entire volume of sizing die 47. The integral of the velocity profile at the exit of sizing die 47, taken over the area of the exit of sizing die 47, determines the flow rate of the coating material which is applied to fiber 41 and, therefore, the diameter of the resulting coated fiber. For a given fiber speed, the velocity profile at the exit of the sizing die is determined by the geometry of the entire sizing die, including the geometry of the die land region, and the viscosity profile of the coating material. Because the geometry of the sizing die is typically fixed, one means for controlling the coated fiber diameter is to adjust the viscosity profile of the coating material in the sizing die, preferably in land region 50.

Previous methods of controlling coated fiber diameter have relied on changing the temperature of the coating material as it is supplied to the coating die assembly. Changing this "bulk" temperature of the coating material has the effect of changing the effect of viscous heating throughout the coating die assembly, thereby altering the viscosity profile of the coating material throughout the coating die assembly. These two effects act in opposition to each other. For example, a decrease in the bulk temperature of the coating material will result in an increase in the viscosity. This increased viscosity will cause more viscous heating to occur, which will increase the temperature of the coating material and, thereby, decrease the viscosity. This results in relatively large variations in coated fiber diameter during the coating process as the viscosity profile of the coating material at or near the region in which the coated fiber diameter is determined continually changes, changing the velocity profile and, consequently, the coated fiber diameter. Also, changing the bulk temperature would occur relatively slowly which would make any method or apparatus for control of coated fiber diameter unable to control short-term fluctuations in coated fiber diameter.

One might attempt to adjust the viscosity of the coating material in the sizing die by adjusting the bulk temperature of the coating material. However, this would require a specially designed heat exchanger to produce rapid changes in the temperature of the coating material in the sizing die.

One aspect of our invention is to localize the heating of the coating material to a region of the coating die assembly in which more rapid changes in the temperature of the coating material within the sizing die can be achieved. For example, heating may be advantageously localized in the portion of the sizing die surrounding land region 50 as the thermal mass of the coating material in land region 50 is less than the thermal mass of the coating material in sizing die 47. The more localized the heating, the more rapid the temperature changes. We have found that adjusting the temperature of the coating material in sizing die 47 provides improved in control of coated fiber diameter. However, very rapid changes in the temperature of the coating material can be achieved by adjusting the temperature of bottom surface 53 of sizing die 47, resulting in very responsive control of coated fiber diameter. By localizing the temperature changes to bottom surface 53, we have achieved coated fiber diameter changes in the range of about 0.2 $\mu$m/sec to 0.5 $\mu$m/sec. We believe this allows for control of coated fiber diameter within about 3 $\mu$m of a desired setpoint. We have achieved steady state control of coated fiber diameter within about 0.3 $\mu$m of a desired setpoint.

Figure 1:
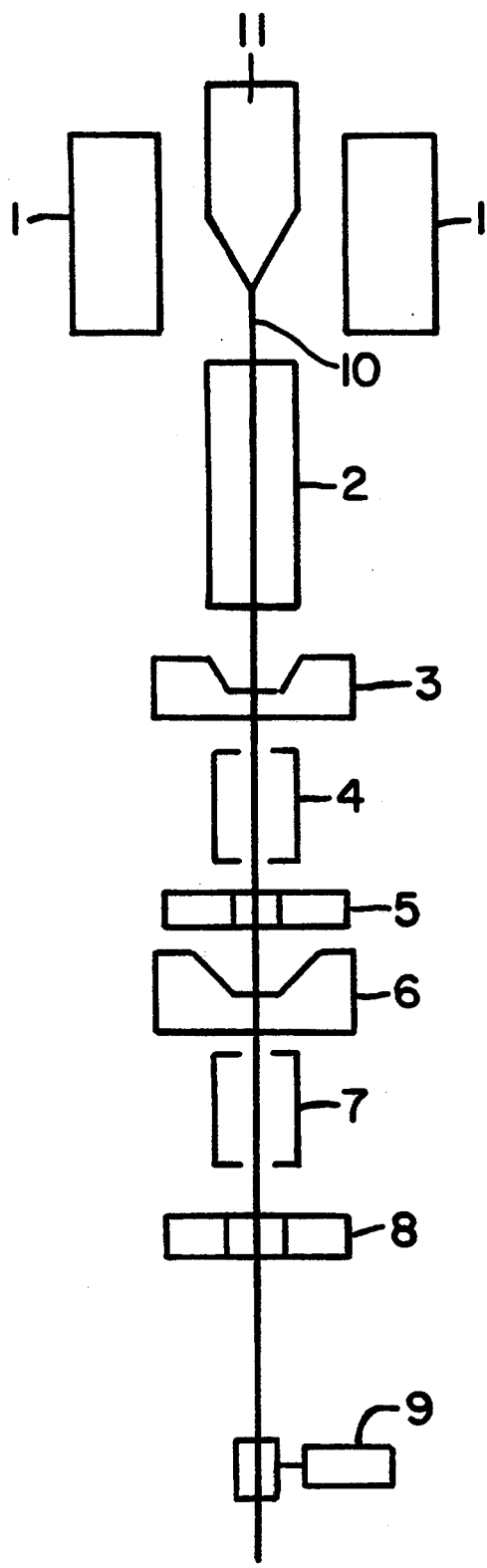
FIG. 1 is a block representation of a typical fiber drawing apparatus.
Figure 3:
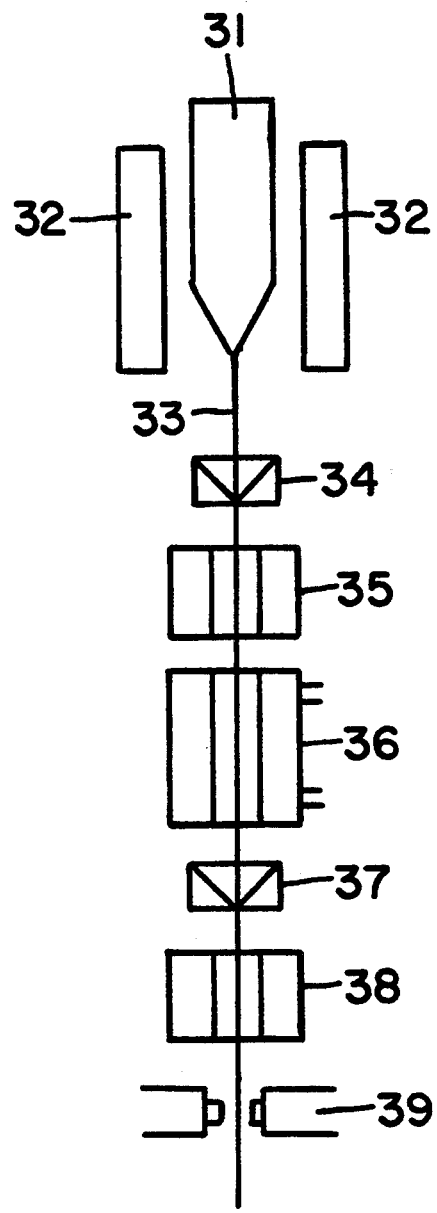
FIG. 3 is a block representation of another prior art fiber drawing apparatus.
Figure 5:
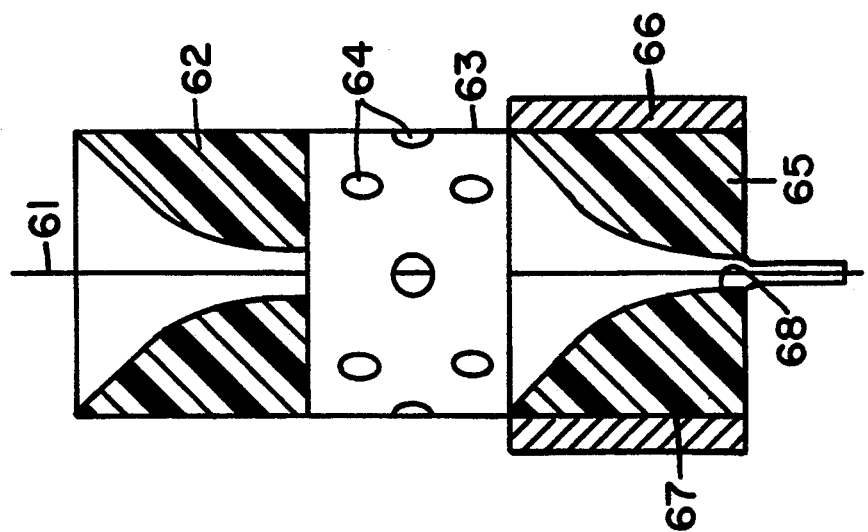
FIG. 5 is a cross-sectional view of a coating die assembly according to one aspect of the present invention.

Further finite element analysis has shown that active temperature control of an outer wall of sizing die 47 will change the temperature of inner wall 52, which in turn will ultimately control the diameter of the coated fiber. FIG. 5 shows one embodiment of the present invention in which a temperature control jacket 66 can be placed around the outside wall 67 of sizing die 65. Jacket 66 is capable of raising or lowering the temperature of the outside wall 67 of sizing die 65, thereby raising or lowering the temperature of inner wall 68. The temperature adjustment provided by jacket 66 is controlled by a control system (not shown) which uses a measurement of the diameter of the coated fiber to determine the level of heating or cooling required to maintain the diameter of the coated fiber at a target value. Fiber 61, guide die 62, insert 63, and coating material supply holes 64 are similar to those described with reference to FIG. 2.

Another embodiment of the present invention is shown in FIG. 6. Guide die 102 is placed within coater block 101. Insert 103 is below guide die 102 and is the entrance for coating material into coating die assembly 100. Sizing die 104 is located below insert 103. Thermoelectric chip 105 is located below sizing die 104 and thermally communicates with sizing die 104. Thermoelectric chip 105 employs the Peltier effect to operate as a heat pump to heat or cool sizing die 104. The direction of heat flow across chip 105 is determined by the direction of electrical current flow within the chip 105 itself. For details on the Peltier effect, see: Caillat et al., "Thermoelectric properties of $(Bi_xSb_{1-x})_2Te_3$ Single Crystal Solid Solutions Grown by the T.H.M. Method", J. Phys. Chem. Solids, vol. 53, no. 8, pp. 1121-29, 1992; and, Patel et al., "Thermoelectric Cooling Effect in a p-$Sb_2Te_3$-n-$Bi_2Te_3$ Thin Film Thermocouple", Solid-State Electronics, vol. 35, no. 9, pp. 1269-72, 1992. As a heat pump, thermoelectric chip 105 requires a thermal reservoir either to supply heat to or to remove heat from the back side of chip 105. This reservoir consists of heat sink 108 that is in thermal communication with chip 105 through chip pedestal 106 and tube 107. The temperature of heat sink 108 is maintained at a constant level with a recirculating water bath. When thermoelectric chip 105 cools sizing die 104, heat sink 108 removes heat from the back side of chip 105. When chip 105 heats die 104, heat sink 108 supplies heat to the back side of chip 105.

Both the voltage level and polarity applied to thermoelectric chip 105 can be adjusted to control the coated diameter of the fiber. As an example, a positive polarity can be defined as the heating mode and a negative polarity can be defined as the cooling mode. An increase in the voltage applied to chip 105 can produce the following three scenarios: voltage can be made less negative, voltage can be changed from negative to positive, and voltage can be made more positive. These three scenarios can respectively cool die 104 less, change die 104 cooling to die 104 heating, and heat die 104 more. All of these actions increase the temperature of the coating near the wall of die land region 109. This increase in coating temperature near the wall of die land region 109 in turn reduces coating viscosity near the wall of die land region 109 and ultimately increases the coated fiber diameter. In a similar fashion, a smaller coated diameter can be produced by decreasing the voltage applied to thermoelectric chip 105.

Figure 7:
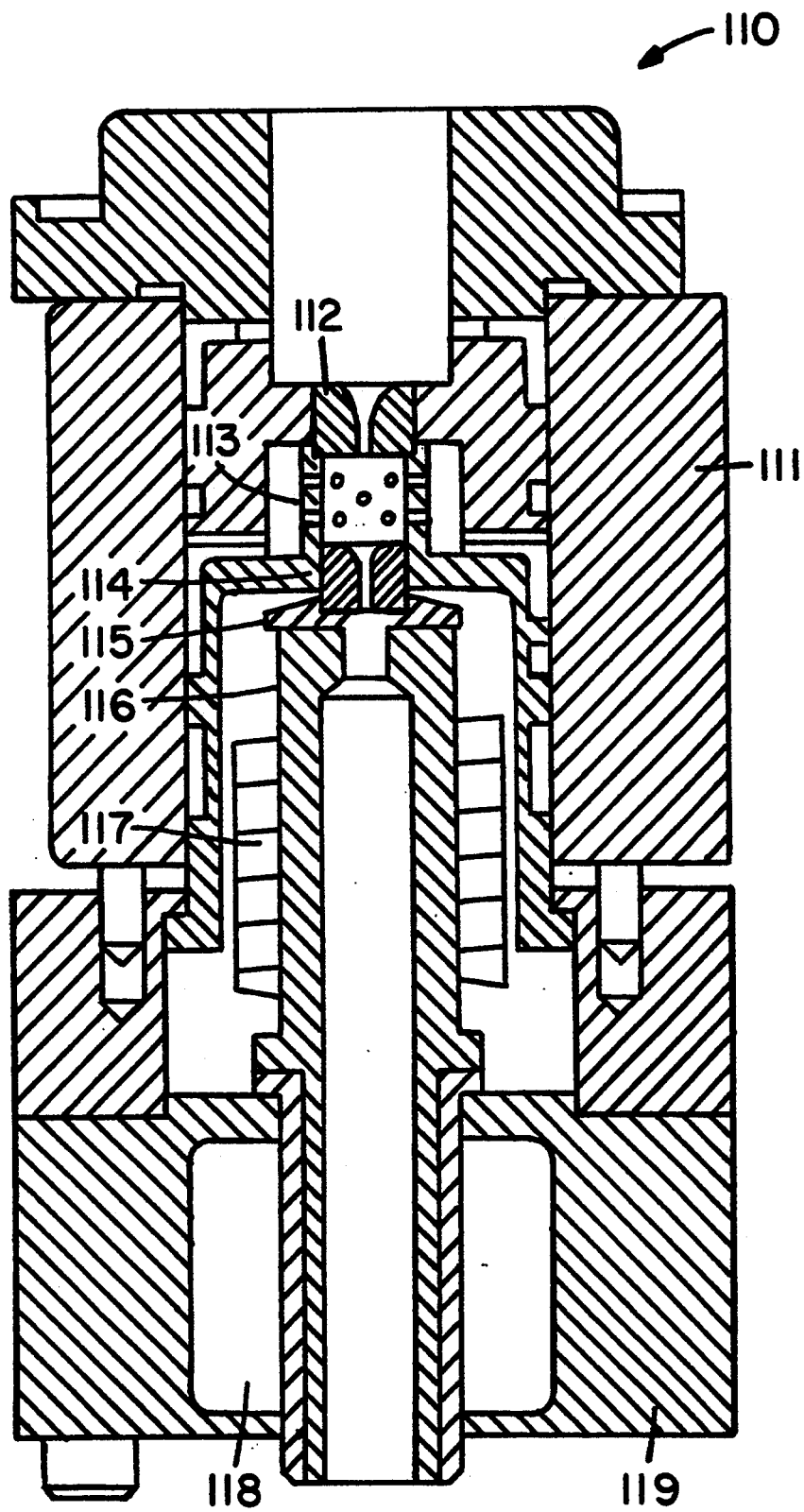
FIG. 7 is a cross-sectional view of a coating die assembly according to another aspect of the present invention.

Another embodiment of the present invention is shown in FIG. 7. Guide die 112 is placed within coater block 111. Insert 113 is below guide die 112 and is the entrance for coating material into coating die assembly 110. Sizing die 114 is located below insert 113. Disk 115 is located below sizing die 114 and thermally communicates with sizing die 114. Disk 115 is made of a high thermal conductivity material to provide efficient transfer of heat to and from sizing die 114. Heat transfer tube 116 is in thermal communication with disk 115. Resistive heater 117 surrounds at least a portion of heat transfer tube 116. A portion of heat transfer tube 116 extends below resistive heater 117 and is in thermal communication with heat sink 118. Heat sink 118 is connected to a fluid circulation system 119 which is used to remove heat from heat sink 118. Because of the thermal communication between heat sink 118, heat transfer tube 116, resistive heater 117, and disk 115, heat may be transferred to or from sizing die 114.

The amount of heat transferred to or from sizing die 114 is adjusted based on a measurement of the diameter of the coated fiber to control the diameter of the coated fiber to a target value. If the measured diameter of the coated fiber is below the target value, heat is transferred to sizing die 114 from resistive heater 117 through disk 115. This is accomplished by increasing the current to resistive heater 117 and will result in an increase in the temperature of the coating material near the wall of sizing die 114 which, in turn, will decrease the viscosity of the coating material near the wall of sizing die 114. The decrease in viscosity of the coating material near the wall of sizing die 114 will increase the amount of coating applied to the fiber, thereby increasing the diameter of the coated fiber. Similarly, if the measured value of the coated fiber is above the target value, heat is transferred from sizing die 114 through disk 115, heat transfer tube 116 and heat sink 118. This is accomplished by increasing the flow of fluid in the circulation system which will result in transferring heat from heat sink 118, thereby reducing the temperature of the coating material near the wall of sizing die 114, which, in turn, will increase the viscosity of the coating material near the wall of sizing die 114. The increase in viscosity of the coating material near the wall of sizing die 114 will decrease the amount of coating material applied to the fiber, thereby reducing the diameter of the coated fiber. The amount of heat transferred through heat sink 118 can also be changed by increasing or decreasing the temperature of the fluid in the circulation system, or by a combination of changing the flow and the temperature of the fluid.

Because of the possibility of adverse effects on physical properties of the coated fiber other than coated fiber diameter, due to the cooling features described in relation to FIG. 7, a preferred embodiment is an apparatus similar to that shown in FIG. 7 without heat sink 118 and fluid circulation system 119. This also simplifies the design of the apparatus. In this case, the diameter of the exit of sizing die 114 would be selected such that some heat would always be required to maintain the coated fiber diameter at the desired value. This requires that the diameter of the exit of the sizing die be made smaller than would be required if both heating and cooling capabilities were included in the coating apparatus. Even without the cooling capabilities provided by the fluid recirculation system, we have achieved a rate of diameter change of about 0.1 $\mu$m/sec when the resistive heater is turned off. This is apparently due to natural cooling occurring with the resistive heater turned off.

For each of the examples described below, the coating material used was a well known acrylate optical fiber coating material which is curable by exposure to ultraviolet light. The nominal uncoated fiber diameter was 125 $\mu$m. Two layers of coating were applied in each example. The first coating layer had a nominal diameter of 205 $\mu$m. The apparatus which is the subject of the present invention was used only for controlling the diameter of the second coating layer. The sizing die used had a diameter in the die land region of about 315 $\mu$m. The draw rate of the fiber was 15 meters/sec in all examples.

In one example, an apparatus similar to that disclosed in FIG. 6 was used in a coating process which was integral to the fiber drawing process. The desired coated diameter in the finished product was 250 $\mu$m. The target value of coated fiber diameter used in the on-line control was adjusted to account for shrinkage of the coating which occurs during shelf storage of the coated fiber. The thermoelectric chip used was a 1.8 watt, model SP1243-01AC available from Marlow Industries Inc. of Dallas, Tex. With a setpoint of 255 $\mu$m for the coated fiber diameter, the average diameter obtained using the apparatus of the present invention with automatic feedback control was 255.0 $\mu$m with a standard deviation of 0.1 $\mu$m. The apparatus was also run in an open loop control mode to determine the maximum and minimum coated fiber diameters attainable. With no cooling or heating applied with the thermoelectric chip, the nominal diameter was 247.4 $\mu$m. With maximum cooling applied, the nominal diameter was 246.9 $\mu$m. With maximum heating applied, the nominal diameter was 256.9 $\mu$m. This results in a coated diameter control range of about 10 $\mu$m by use of the thermoelectric chip.

In another example, an apparatus similar to that disclosed in FIG. 7 was used in an off-line coating process which was not integral to the fiber drawing process. The off-line coating process of this example applied only a second coating layer to a fiber which already had a first coating layer with a nominal diameter of 205 $\mu$m. Because the coating process in this example was off-line, the temperature of the fiber entering the coating die assembly was lower than it would have been if the coating process had occurred as an integral part of the fiber drawing process. This resulted in substantially higher fiber diameters as compared to the first example. The disk and the heat transfer tube were both made of copper. The resistive heater was a 60 watt heater. The heat sink was maintained at 0° C. The apparatus was run in an open loop control mode to determine the maximum and minimum coated fiber diameters attainable. With no cooling or heating applied through the disk, the nominal coated fiber diameter was 268.3 $\mu$m. When maximum cooling was applied, the nominal coated fiber diameter was about 265 $\mu$m. With maximum heat applied, the nominal coated fiber diameter was about 279.2 $\mu$m. This resulted in a coated fiber diameter control range of about 15 $\mu$m. Although this example was not run in an automatic control mode, we believe that the diameter control would be equal to, or better than, that of the thermoelectric chip test described above.

There are numerous advantages to the present invention. First, the active control of the diameter of the secondary coating provides more accurate control of the overall diameter of the coated fiber. This makes it possible to meet tighter tolerances with respect to the diameter of the coated fiber. Second, the active control can compensate for variations in geometry from one sizing die to another. Such variations are common and are practically impossible to avoid completely. If the nominal diameter of the secondary coated fiber is 255 $\mu$m and the diameter of the primary coated fiber as it enters the secondary coater assembly is nominally 205 $\mu$m, a difference of about 10 $\mu$m in the inside diameter of a sizing die with a 315 $\mu$m nominal diameter results in a change of about 5 $\mu$m in the diameter of the secondary coated fiber without active control of the secondary diameter. Third, we believe that using the method and apparatus of the present invention may allow the coating process to be run at fiber and coating material bulk temperatures which favorably impact the overall stability of the coating process. We believe that having control of the bulk temperature of the coating material as it enters the coating assembly which is independent from the control of the temperature of the coating material at or near the region in which the coated fiber diameter is determined contributes to improved coated fiber diameter control as well as to the overall stability of the drawing and coating processes. The improved coated fiber diameter control results from the responsiveness of changing the temperature of the smaller mass of the coating material at or near the region in which coated fiber diameter is determined as compared to heating the substantially larger mass necessary to adjust the bulk temperature of the coating material.

In the case of a coating process which includes the application of two or more layers of coating material to a fiber, it is important to control the coated diameter of each layer. Therefore, another advantage of the present invention is that it is equally applicable to any coating layer applied to a fiber. This allows for equipment standardization as well as minimizing the space used on fiber drawing equipment for controlling the diameter of the coated fiber.

The present invention has been particularly shown and described with reference to the preferred embodiments thereof, however, it will be understood by those skilled in the art that various changes may be made in the form and details of these embodiments without departing from the true spirit and scope of the invention as defined by the following claims. For example, the present invention would be applicable to the manufacture of ribbon cables, wherein it is desirable to control the thickness of an overcoating which is applied to an array of optical fibers. Also, the present invention is applicable to the application of the primary, secondary and any other coatings applied to single optical fibers. The present invention is also applicable to coating processes which are not integral to the fiber drawing process such as, for example, stand-alone coating processes.

We claim:

1. A method for coating an optical waveguide fiber, comprising the steps of
   a. passing an optical waveguide fiber through a coating die containing a coating material, said coating material being a curable material, and said coating die including a sizing die,
   b. coating said fiber with a layer of said coating material,
   c. measuring the coated fiber diameter and generating a diameter signal which is representative of said coated fiber diameter, and
   d. controlling the coated fiber diameter by varying the temperature of at lest a portion of said sizing die in response to the difference between said diameter signal and a predetermined target value.

2. The method of claim 1, wherein said controlling step comprises controlling the temperature of an outer wall surface of said sizing die.

3. The method of claim 2, wherein said outer wall surface comprises the bottom surface of said sizing die.

4. The method of claim 1, wherein said coating step comprises applying said coating material as a secondary coating layer over a primary coating layer applied to said optical waveguide fiber.

5. The method of claim 1, wherein the temperature of the coating material is varied such that coated fiber diameter is varied at a rate up to about 0.5 $\mu$m/sec for a fiber drawing speed of about 15 m/sec.

6. The method of claim 1, wherein said at least a portion of said sizing die comprises a portion of said sizing die wherein the diameter of said sizing die is substantially constant.

7. The method of claim 1, wherein said coated fiber diameter is maintained within about 3 $\mu$m of said predetermined target value.

8. The method of claim 7, wherein said coated fiber diameter is maintained within about 0.3 $\mu$m of said predetermined value.

9. An apparatus for coating an optical waveguide fiber, comprising
   a. a coater for applying a coating material to the fiber to form a coating layer on the fiber, said coater including a sizing die with a die land region wherein the diameter of said sizing die is substantially constant, and wherein said coating material is a curable material.
   b. a curing device for curing said coating layer,
   c. a diameter measurement device for measuring the diameter of the fiber including said coating layer and generating a diameter signal representative of said diameter,
   d. a heater operatively associated with said die land region, and
   e. a controller for varying the heat supplied from said heater to said die land region in response to said diameter signal 10. The apparatus of claim 9, wherein said sizing die includes a bottom surface, and, wherein said heater is operatively associated with said bottom surface of said sizing die.

11. The apparatus of claim 10, wherein said heater further comprises a thermoelectric chip.

12. The apparatus of claim 10, wherein said means for controlling the temperature of a portion of said coating means further comprises
   a. a disk of high thermal conductivity material which is in thermal communication with the bottom of said sizing die,
   b. a heat transfer tube which is in thermal communication with said disk, and
   c. a resistive heater which is in thermal communication with said heat transfer tube,
wherein said disk, said heat transfer tube, and said resistive heater are in thermal communication with said bottom surface of said sizing die.

13. The apparatus of claim 12, further comprising a fluid circulation system which is in thermal communication with said heat transfer tube.

14. An apparatus for coating an optical waveguide fiber, comprising
   a. a sizing die with a land region and a bottom surface to which a curable coating material is supplied,
   b. means for curing said coating material,
   c. means for measuring the diameter of the fiber after the coating material has been applied, and
   d. means for heating and sizing die in response to a deviation of a measured coated diameter from a desired value,
said means for heating further comprising means for localized heating in said land region.

15. The apparatus of claim 14, wherein said means for heating further comprises a resistive heater in thermal communication with said bottom surface of said sizing die.

16. The apparatus of claim 14, wherein said means for heating further comprises a thermoelectric chip.

17. A method for controlling a coated diameter of an optical fiber, comprising the steps of
   a. introducing the fiber to a coating device, said coating device being supplied with a curable coating material,
   b. applying a layer of said curable coating material to the fiber,
   c. removing the fiber from the coating device through a sizing die,
   d. curing the layer of curable coating material,
   e. measuring the coated diameter of the fiber and generating a signal representative of the coated diameter,
   f. comparing the signal to a predetermined desired value of the coated fiber diameter, and
   g. controlling the coated diameter by locally heating the coating material adjacent to said sizing die to vary the viscosity of the coating material adjacent to the sizing die, thereby varying the coated diameter.

* * * * *